UNITED STATES PATENT OFFICE.

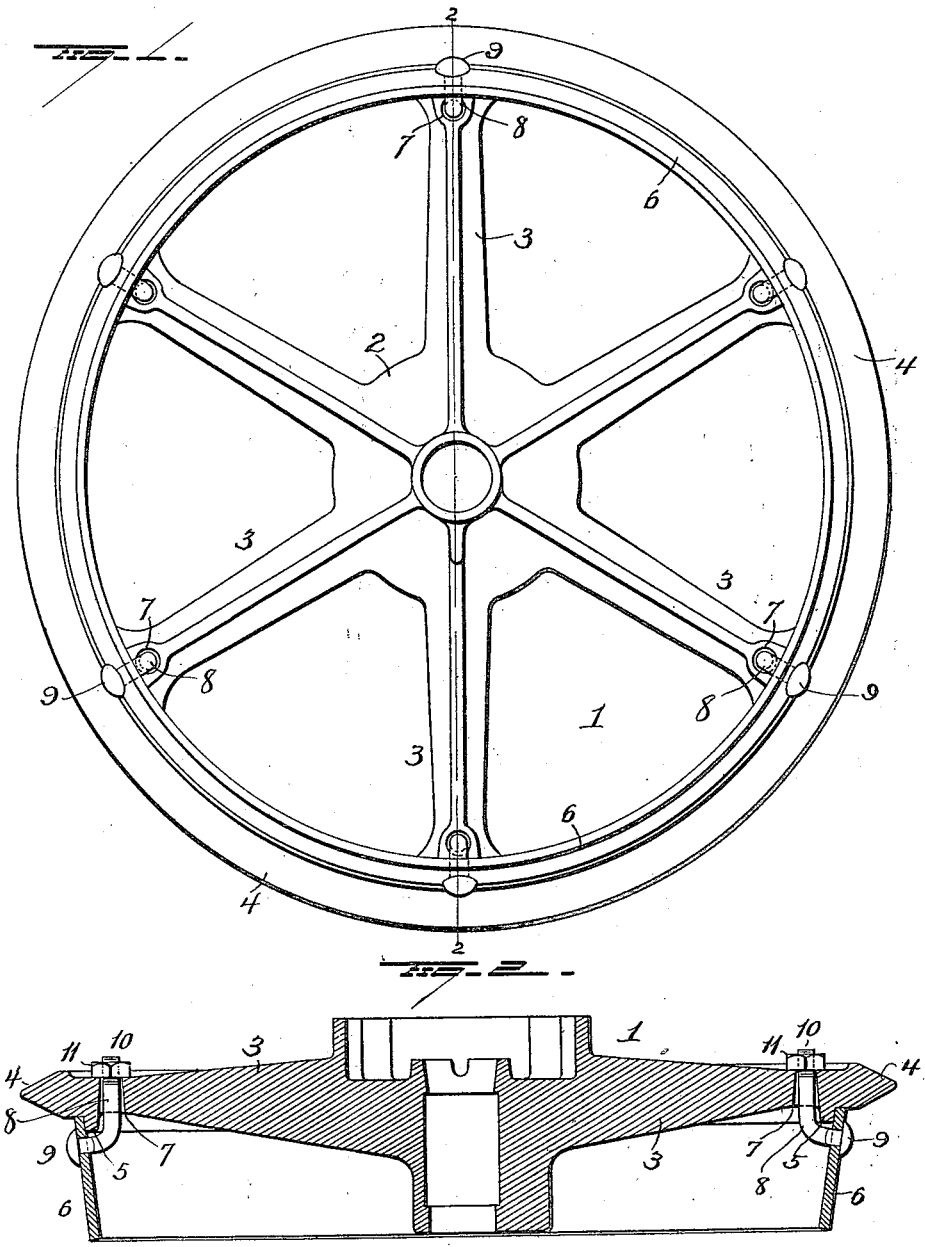

RUDOLPH J. ALTGELT, OF SOUTH BEND, INDIANA, ASSIGNOR TO OLIVER CHILLED PLOW WORKS, OF SOUTH BEND, INDIANA.

WHEEL.

1,410,540.      Specification of Letters Patent.      Patented Mar. 28, 1922.

Application filed May 24, 1920. Serial No. 383,825.

*To all whom it may concern:*

Be it known that I, RUDOLPH J. ALTGELT, a citizen of the United States, and a resident of South Bend, in the county of St. Joseph and State of Indiana, have invented certain new and useful Improvements in Wheels; and I do hereby declare the following to be a full, clear, and exact description of the invention, such as will enable others skilled in the art to which it appertains to make and use the same.

This invention relates to improvements in wheels and more particularly to such as are intended for use with agricultural implements, as plows, and especially for disk plows,—one object of the invention being to provide a wheel of this character having a rim portion which has a V-shaped cross-section, with a rim extension or supplemental broad rim to prevent the wheel from penetrating soft ground too deeply, and to provide simple and efficient means whereby such rim extension or supplemental rim may be easily, quickly and firmly secured to the wheel, or removed from the latter, if desired, when the implement is to be used in working in hard ground.

With this and other objects in view, the invention consists in certain novel features of construction and combinations of parts as hereinafter set forth and pointed out in the claims.

In the accompanying drawings; Figure 1 is a view in elevation of a wheel embodying my improvements, and Figure 2 is a transverse sectional view on the line 2—2 of Figure 1.

1 represents a wheel suitable for use on an agricultural implement such as a plow, and comprises a hub portion 2, spokes 3 and a rim 4,—the peripheral portion of the latter being made V-shaped in cross-section as clearly shown in Figure 2.

The rim 4 is provided, near the base of its V-shaped peripheral portion, with an annular, laterally projecting flange 5 which forms a seat for the inner edge portion of a lateral rim extension or supplemental rim 6. This supplemental rim may be made of steel and is sufficiently broad to form a wide tread for the wheel and operate to prevent the latter from sinking to an undesirable extent into soft ground, and the said supplemental rim may be made slightly tapering, as is often desirable in the construction of wheels for plows,—especially disk plows.

For securing the supplemental rim to the wheel so that its application shall be efficient and enduring and at the same time, so that it may be readily removed should it be desired to omit the same when the wheel is employed on a plow working in hard ground, the features now to be described have been found to be efficacious.

Near the junctures of the several spokes with the permanent rim portion 4 of the wheel, perforations 7 are made and these perforations are preferably made somewhat tapering as clearly shown in Figure 2 so as to facilitate the passage of bent or approximately L-shaped bolts 8, the short ends of which are passed through perforations in the supplement rim and upset as illustrated at 9. The longer members of the bent bolts which pass through the holes 7 are threaded, as at 10 to receive nuts 11 which bear against suitable seats on the spokes at points near the permanent rim 4. Thus the supplemental rim, seated on the flange of the permanent rim, is firmly secured to the spokes of the wheel through the medium of the bent bolts, and by removing the nuts 10 from these threaded bolts, the supplemental rim may be easily removed from the wheel.

Having fully described my invention what I claim as new and desire to secure by Letters-Patent, is:—

1. The combination with a wheel having an annular shoulder near the base of its rim, of a supplemental rim seated on said shoulder and projecting laterally from the wheel and inwardly removed from the peripheral portion of the main rim of the wheel, and fastening devices engaging the wheel and said supplemental rim for securing the latter in place.

2. The combination of a wheel having a rim portion, a flangeless supplemental rim projecting laterally from said rim portion inwardly of the periphery of the latter and angular bolts securing said supplemental rim in place directly to the wheel.

3. The combination of a wheel having a rim portion, a supplemental rim projecting laterally from said rim portion inwardly of the periphery of the latter, angular bolts passing through said supplemental rim and through a part of the wheel, each bolt having a head at one end and a nut threaded on the other end.

4. The combination with a wheel comprising a hub portion, a permanent rim and spokes connecting said hub and rim, said spokes having holes near said rim, and said rim having an annular flange near the spokes, of a supplemental rim seated on said flange and projecting laterally from the wheel, and bent bolts passing through the holes in the spokes and through said supplemental rim, each of said bolts having a head at one end and a nut threaded on the other end.

In testimony whereof, I have signed this specification in the presence of two subscribing witnesses.

RUDOLPH J. ALTGELT.

Witnesses:
T. C. CLINTON,
GEO. G. JOHNSON.